(12) United States Patent
Lester

(10) Patent No.: US 9,146,039 B2
(45) Date of Patent: Sep. 29, 2015

(54) ENERGY GENERATION SYSTEM

(75) Inventor: Stephen Patrick Lester, Mayfield (GB)

(73) Assignee: Flint Engineering Limited, Mayfield, East Sussex (GB)

( * ) Notice: Subject to any disclaimer, the term of this patent is extended or adjusted under 35 U.S.C. 154(b) by 85 days.

(21) Appl. No.: 13/513,317

(22) PCT Filed: Dec. 2, 2010

(86) PCT No.: PCT/GB2010/052010
§ 371 (c)(1),
(2), (4) Date: Jun. 20, 2012

(87) PCT Pub. No.: WO2011/067600
PCT Pub. Date: Jun. 9, 2011

(65) Prior Publication Data
US 2013/0000699 A1    Jan. 3, 2013

(30) Foreign Application Priority Data

Dec. 3, 2009 (GB) .................................... 0921209.3
Oct. 7, 2010 (GB) .................................... 1016874.8

(51) Int. Cl.
| H01L 31/058 | (2006.01) |
| F03G 6/00 | (2006.01) |
| F24D 11/02 | (2006.01) |
| F24J 2/04 | (2006.01) |
| F24D 17/00 | (2006.01) |
| F24D 17/02 | (2006.01) |

(Continued)

(52) U.S. Cl.
CPC ........ *F24D 11/0221* (2013.01); *F24D 17/0021* (2013.01); *F24D 17/02* (2013.01); *F24J 2/04* (2013.01); *H02S 40/38* (2014.12); *H02S 40/44* (2014.12); *F24D 2200/12* (2013.01); *F24D 2200/14* (2013.01); *F24H 2240/122* (2013.01); *Y02B 10/20* (2013.01); *Y02B 10/70* (2013.01); *Y02B 30/126* (2013.01); *Y02E 10/46* (2013.01); *Y02E 10/60* (2013.01)

(58) Field of Classification Search
USPC .................................. 136/248, 246; 60/641.8
See application file for complete search history.

(56) References Cited

U.S. PATENT DOCUMENTS

| 4,002,031 A | 1/1977 | Bell |
| 4,052,001 A * | 10/1977 | Vogt .............................. 126/585 |
| 5,259,363 A * | 11/1993 | Peacock et al. ................ 126/621 |

(Continued)

FOREIGN PATENT DOCUMENTS

| IL | WO2008/114248 | * | 9/2008 | ............ H01L 31/058 |
| WO | 2008114248 A1 | | 9/2008 | |
| WO | 2011/012917 A | | 2/2011 | |

OTHER PUBLICATIONS

International Preliminary Report on Patentability of PCT/GB2010/052010 dated Jun. 5, 2012.

(Continued)

*Primary Examiner* — Devina Pillay
(74) *Attorney, Agent, or Firm* — Banner & Witcoff, Ltd.

(57) ABSTRACT

An energy generation system comprises: (i) a first system comprising an electrical generator for converting at least a portion of solar energy into electrical energy; and (ii) a second system, in thermal contact with said first system by means of a device for transferring heat energy from said first system to said second system. The second system comprises a device for converting at least a portion of heat energy from said second system, into electrical energy.

7 Claims, 3 Drawing Sheets

(51) Int. Cl.
*H02S 40/38* (2014.01)
*H02S 40/44* (2014.01)

(56) References Cited

U.S. PATENT DOCUMENTS

| | | | |
|---|---|---|---|
| 6,080,927 A * | 6/2000 | Johnson | 136/248 |
| 6,434,942 B1 | 8/2002 | Charlton | |
| 7,281,381 B2 * | 10/2007 | Johnson | 60/641.15 |
| 2005/0039791 A1 * | 2/2005 | Johnson | 136/259 |
| 2005/0109387 A1 * | 5/2005 | Marshall | 136/253 |
| 2008/0053513 A1 | 3/2008 | Palmer | |
| 2008/0230111 A1 | 9/2008 | Uehlin | |
| 2008/0314438 A1 | 12/2008 | Tran | |
| 2009/0173337 A1 * | 7/2009 | Tamaura et al. | 126/634 |

OTHER PUBLICATIONS

International Search Report of PCT/GB2010/052010 dated Mar. 26, 2012.

Search Report of GB1016874.8 dated Oct. 26, 2011.

* cited by examiner

ENERGY GENERATION SYSTEM

The present invention relates to an energy generation system, and in particular an energy generation system suitable for generating electrical and/or heat energy.

One type of existing energy generation system comprises a panel often referred to as a photovoltaic panel which is adapted to convert solar energy into electrical energy, which can be either stored in a suitable storage device and then used as required, or transferred to the national electricity network for example.

Whilst photovoltaic panels are widely used, they suffer from a number of disadvantages, in particular a reduction in efficiency as their temperature increases. This problem has been addressed to some extent by the implementation of improved cooling systems. However, such cooling systems are not always effective and moreover can significantly increase the cost of the energy generation system as a whole.

An aim of the present invention is to provide an improved energy generation system which overcomes or at least alleviates the problems associated with known energy generation systems, in particular those incorporating photovoltaic panels.

In accordance with the present invention there is provided an energy generation system comprising:
 (i) a first system comprising an electrical generator for converting at least a portion of solar energy into electrical energy;
 (ii) a second system, in thermal contact with said first system by means of a device for transferring heat energy from said first system to said second system, said second system comprising a device for converting at least a portion of heat energy from said second system, into electrical energy.

It will be understood by persons skilled in the art that solar energy comprises heat energy and light energy.

Preferably, said electrical generator for converting at least a portion of solar energy into electrical energy comprises at least one photovoltaic cell.

Preferably, said device for converting at least a portion of heat energy from said second system into electrical energy comprises a Stirling Engine.

Preferably, said device for transferring heat energy from said first system to said second system comprises a heat exchanger.

Said energy generation system may further comprise a third system in thermal contact with said second system by means of a device for transferring heat energy from said second system to said third system, said third system comprising a device for transferring at least a portion of heat energy from said third system, to a fluid reservoir.

Preferably, said device for transferring heat energy from said second system to said third system comprises a condenser.

Said energy generation system may further comprise a device for inputting heat energy into said second system.

Preferably, said device for inputting heat energy into said second system comprises a heat pump.

Said first system may further comprise at least one first continuous conduit containing a fluid, wherein a portion of said first continuous conduit is in thermal contact with at least a portion of said electrical generator.

Said second system may further comprise at least one second continuous conduit containing a fluid, wherein at least a first portion of said second continuous conduit is in thermal contact with said device for converting at least a portion of heat energy from said second system into electrical energy.

Said third system may further comprise at least one third continuous conduit containing a fluid, wherein said device for transferring at least a portion of heat energy from said third system to a fluid reservoir comprises a portion of said third continuous conduit which is in thermal contact with said fluid reservoir.

Preferably a second portion of said second continuous conduit is additionally in thermal contact with said device for converting at least a portion of heat energy from said second system into electrical energy.

Preferred embodiments of the present invention will now be described, by way of example only and not in any limitative sense, with reference to the accompanying drawings in which.

Figure 1:
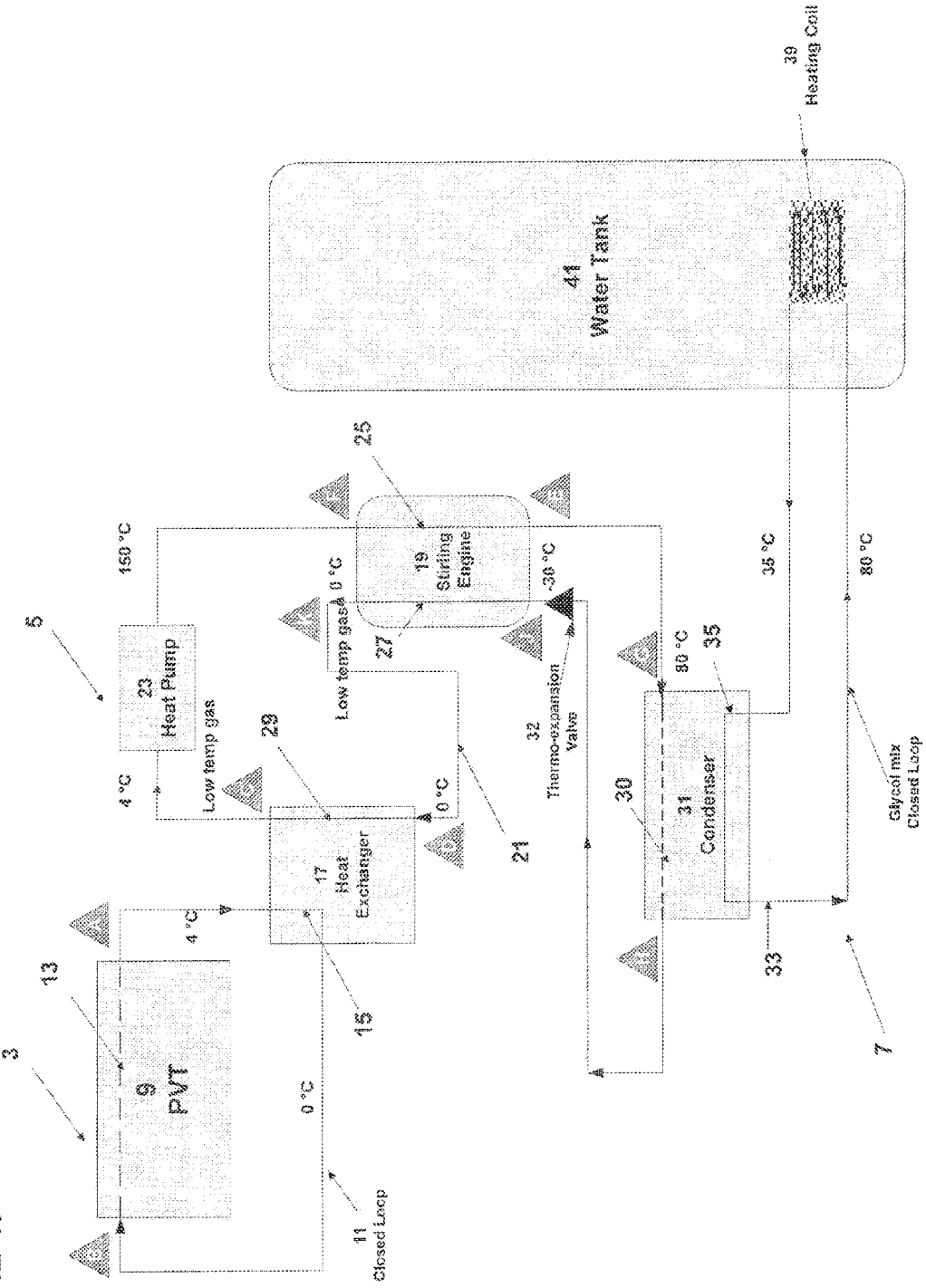
FIG. 1 shows a schematic view of an energy generation system in accordance with a first embodiment of the present invention.

With reference to FIG. 1, a first embodiment of an energy generation system is represented generally by reference numeral 1.

The energy generation system 1 comprises a first system 3, a second system 5 and a third system 7, wherein the first system 3 is in thermal contact with the second system 5, and the second system 5 is in thermal contact with the third system 7, as will be described in more detail below.

The first system 3 comprises an electrical generator for converting light energy from the sun into electrical energy, in the form of a photovoltaic panel 9. In order to improve the efficiency of the photovoltaic panel 9, the first system 3 further comprises a first continuous conduit 11 in the form of a closed loop. The first conduit 11 contains a fluid, for example a mixture of glycol and water, which is circulated around the closed loop by means of a suitable fluid pump (not shown). A first portion 13 of the first conduit 11 is in thermal contact with the photovoltaic panel 9, and a second portion 15 of the first conduit 11 is in thermal contact with a device for transferring heat energy from the first system 3 to the second system 5 in the form of a heat exchanger 17.

The second system 5 comprises a device for converting at least a portion of heat energy from said second system into electrical energy, in the form of a Stirling Engine 19. The second system 5 further comprises a second continuous conduit 21 in the form of a closed loop. The second conduit 21 contains a fluid, for example a mixture of glycol and water, which is circulated around the closed loop by means of a suitable fluid pump (not shown). A first portion 25 of the second conduit 21 is in thermal contact with the Stirling Engine 19, and a second portion 27 of the second conduit 21 is additionally in thermal contact with the Stirling Engine, downstream of the first portion 25 of the second conduit 21. The energy generation system 1 further comprises a device for inputting heat energy into the second system 5, in the form of a heat pump 23. The heat pump 23 is disposed upstream of the Stirling Engine 19. A third portion 29 of the second conduit 21 is in thermal contact with the heat exchanger 17, and a fourth portion 30 of the second conduit 21 is in thermal contact with a device for transferring heat energy from the second system 5 to the third system 7 in the form of a condenser 31. The energy generation system 1 further comprises a thermo expansion valve 32 disposed downstream of the condenser 31.

The third system 7 comprises a third continuous conduit 33 in the form of a closed loop. The third conduit 33 contains a fluid, for example a mixture of glycol and water, which is circulated around the closed loop by means of a suitable fluid pump (not shown). The third system 7 further comprises a coiled portion 39 for transferring at least a portion of heat energy from the third system 7 to a fluid reservoir. A first portion 35 of the third conduit 33 is in thermal contact with the condenser 31. The fluid reservoir is in the form of a water tank 41 containing a body of water to be heated.

The energy generation system 1 operates as follows:

Solar energy, in particular light energy from the sun, impinges upon the photovoltaic panel 9, with the result that electrical energy is generated, which may be stored in a suitable storage device, or used immediately.

Turning next to the first system 3, the fluid circulating around the first conduit 11 cools the photovoltaic panel 9 on account of the second portion 15 of the first conduit 11 being in thermal contact with the heat exchanger 17. In particular, the first conduit 11 and the second conduit 21, both of which contain fluid, pass through the heat exchanger 17 but are not in physical contact with each other. As the fluid in the first conduit 11 leaves the photovoltaic panel 9 at A and passes through the heat exchanger 17, it gives up a portion of its heat energy to the fluid in the second conduit 21 passing through the heat exchanger 17. As a result, the fluid in the first conduit 11 leaving the heat exchanger 17 is cooler than it was when it entered the heat exchanger 17, with the result that the fluid in the first conduit 11 entering the photovoltaic panel 9 at B is cooler than it was when it left the photovoltaic panel 9 at A. This cooled fluid serves to cool the photovoltaic panel 9, thereby improving its efficiency.

Turning next to the second system 5, as will be understood from the above description, the fluid circulating around the second conduit 21 removes heat energy from the fluid circulating around the first conduit 11. As a result, the fluid in the third portion 29 of the second conduit 21 leaving the heat exchanger 17 at C is hotter than it was when it entered the heat exchanger 17 at D, and takes the form of a low temperature gas. The low temperature gas then passes through the heat pump 23, whereupon it has its temperature raised by means of the heat energy inputted by the heat pump 23. It will be appreciated by persons skilled in the art that energy from an external source is required to be inputted into the heat pump to make it work, that is, to facilitate the input of heat energy into the low temperature gas passing through the heat pump.

After leaving the heat pump 23, the second conduit 21 enters the Stirling Engine 19, with the result that a first portion 25 of the second conduit 21 is in thermal contact with the Stirling Engine 19. As the fluid passes through the Stirling Engine 19, heat energy is removed from it, with the result that the fluid leaving the Stirling Engine 19 at E is cooler than it was when it entered the Stirling Engine 19 at F. The heat energy removed from the fluid is then converted into mechanical energy inside the Stirling Engine 19, the mechanical energy being subsequently converted into electrical energy, which may be stored in a suitable storage device, or used immediately.

After leaving the Stirling Engine 19 at E, the second conduit 21 enters the condenser 31 at G. As the fluid passes through the condenser 31, it has heat energy removed from it, with the result that the fluid is condensed from a gas back into a liquid state.

After leaving the condenser 31 at H, the second conduit 21 enters the thermo expansion valve 32, with the result that heat energy is removed from the fluid. As a result, the fluid leaving the thermo expansion valve 32 is cooler than it was when it entered the thermo expansion valve 32.

After leaving the thermo expansion valve 32, the second conduit 21 re-enters the Stirling Engine 19 at J and leaves the Stirling Engine again at K, with the result that the temperature of the fluid increases slightly on account of the hot environment inside the Stirling Engine 19. It is to be appreciated that the efficiency of the Stirling Engine 19 increases if the difference in temperature of the fluid between F and K increases. Accordingly, the reduction in the temperature of the fluid as it passes through each of the Stirling Engine 19, the condenser 31, and the thermo expansion valve 32, serves to increase the difference in temperature of the fluid between F and K, with the result that the efficiency of the Stirling Engine 19 increases.

After leaving the Stirling Engine 19 at K, the second conduit 21 re-enters the heat exchanger 17, where the process begins again.

Turning next to the third system 7, the fluid in the third conduit 33 has its temperature increased as it passes through the condenser 31 on account of the heat energy that is removed from the second system 5 being transferred to the fluid in the third conduit 33.

After leaving the condenser 31, the third conduit 33 enters the water tank 41, with the result that heat energy from the fluid leaving the condenser 31 is transferred to the water contained within the tank 41. In particular, the third conduit 33 incorporates a coiled portion 39, which is in thermal contact with the water in the tank 41. This results in the temperature of the water in the tank 41 increasing.

Figure 2:
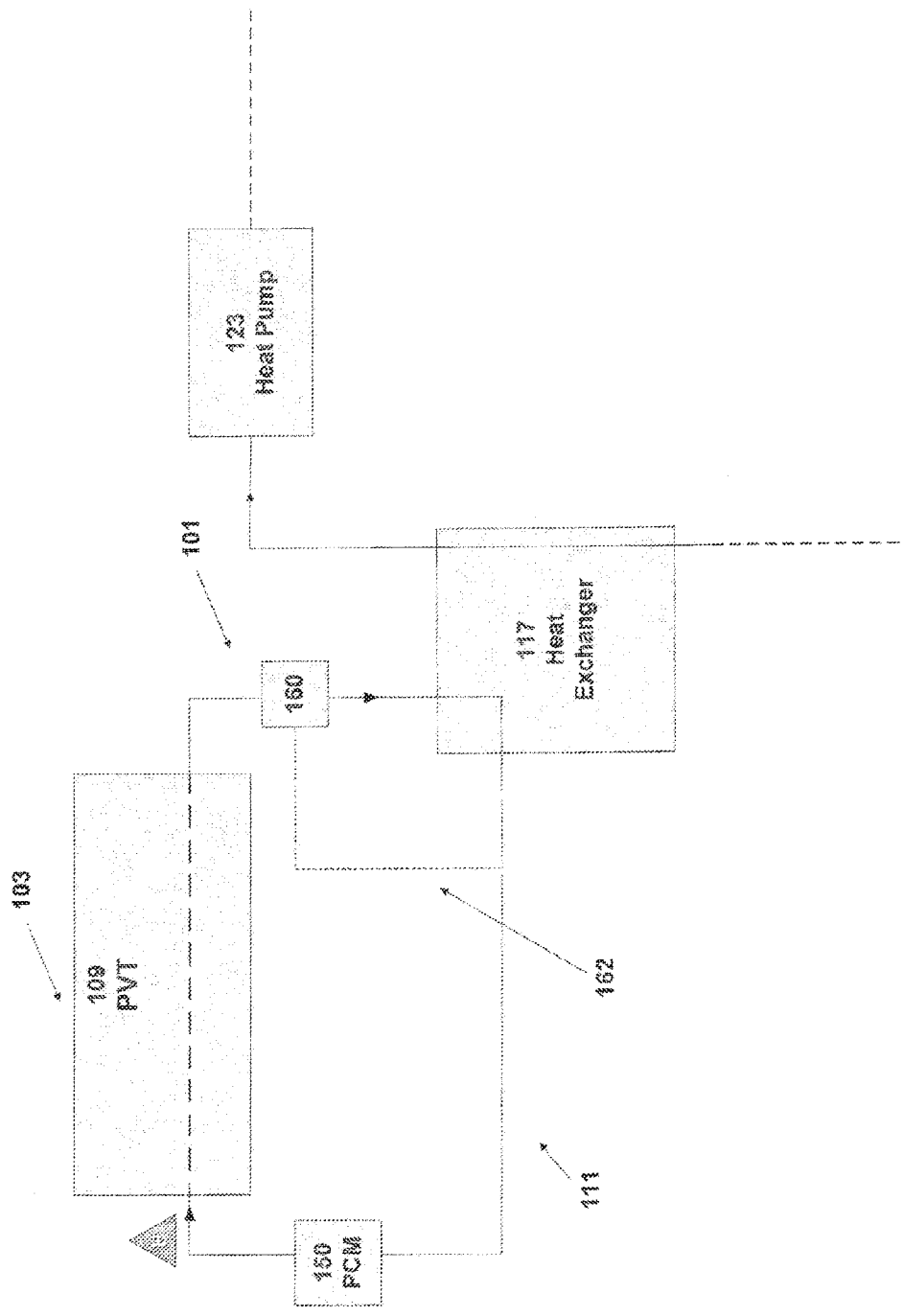
FIG. 2 shows a schematic view of a portion of an energy generation system in accordance with a second embodiment of the present invention.

With reference to FIG. 2, a portion of a second embodiment of an energy generation system is represented generally by reference numeral 101.

The following description of the operation of the energy generation system 101 will be limited only to aspects of operation of the first system 103, with the remainder of the energy generation system 101 operating in the same fashion as the energy generation system 1 of the first embodiment.

This embodiment is similar to the embodiment of FIG. 1, but for the additional inclusion of a device 150 for ensuring that the photovoltaic panel 109 is not cooled to such a degree that condensation accumulates on the photovoltaic panel 109, a means for bypassing the heat exchanger 117 in the form of a solenoid valve 160 and a bypass conduit 162.

The device 150 comprises a phase changing material (PCM) disposed upstream of the photovoltaic panel 109 and in thermal contact with the first conduit 111. A PCM is a material which solidifies at a certain temperature, absorbing or releasing heat energy when the material changes from a solid to a liquid and vice versa.

The energy generation system 101 operates as follows:

When the energy generation system 101 is first activated, the fluid circulating around the first conduit 111 is at ambient temperature. However, when the energy generation system 101 has been active for some time, the temperature of the fluid entering the photovoltaic panel 109 at B begins to drop. On account of this, the temperature of the PCM also begins to drop, with the result that the PCM changes state from a liquid to a solid. Whilst the efficiency of the photovoltaic panel 109 improves upon cooling, when the temperature of the fluid entering the photovoltaic panel 109 at B drops too much, condensation can form on the photovoltaic panel 109, resulting in the heat pump 123 shutting down. In the event that temperature sensors (not shown) on the photovoltaic panel 109 sense that the temperature of the photovoltaic panel 109 is too low, the solenoid valve 160 opens the bypass conduit 162 so that the fluid bypasses the heat exchanger 117. As a result of bypassing the heat exchanger 117, the fluid entering the PCM 150 is now at a higher temperature than it would have been had it not bypassed the heat exchanger 117. The higher temperature fluid then gives up some of its heat energy to the PCM 150, with the result that the PCM 150 changes from a solid into a liquid. As a result, the fluid leaving the PCM 150 is now slightly cooler, yet still at a higher temperature than it would have been had it not bypassed the heat exchanger 117. As a result, the temperature of the photovoltaic panel 109 increases and as a consequence the condensation is removed. Once the temperature sensors (not shown) on the photovoltaic panel 109 sense that the temperature of the photovoltaic panel is starting to get too high again, the solenoid valve 160 closes the bypass conduit 162 so that the fluid no longer bypasses the heat exchanger 117. In this way, the energy generation system 103 includes a feedback loop feature which effectively maintains the photovoltaic panel 109 within its optimal temperature range, which ensures that the heat pump 123 does not shut down.

Figure 3:
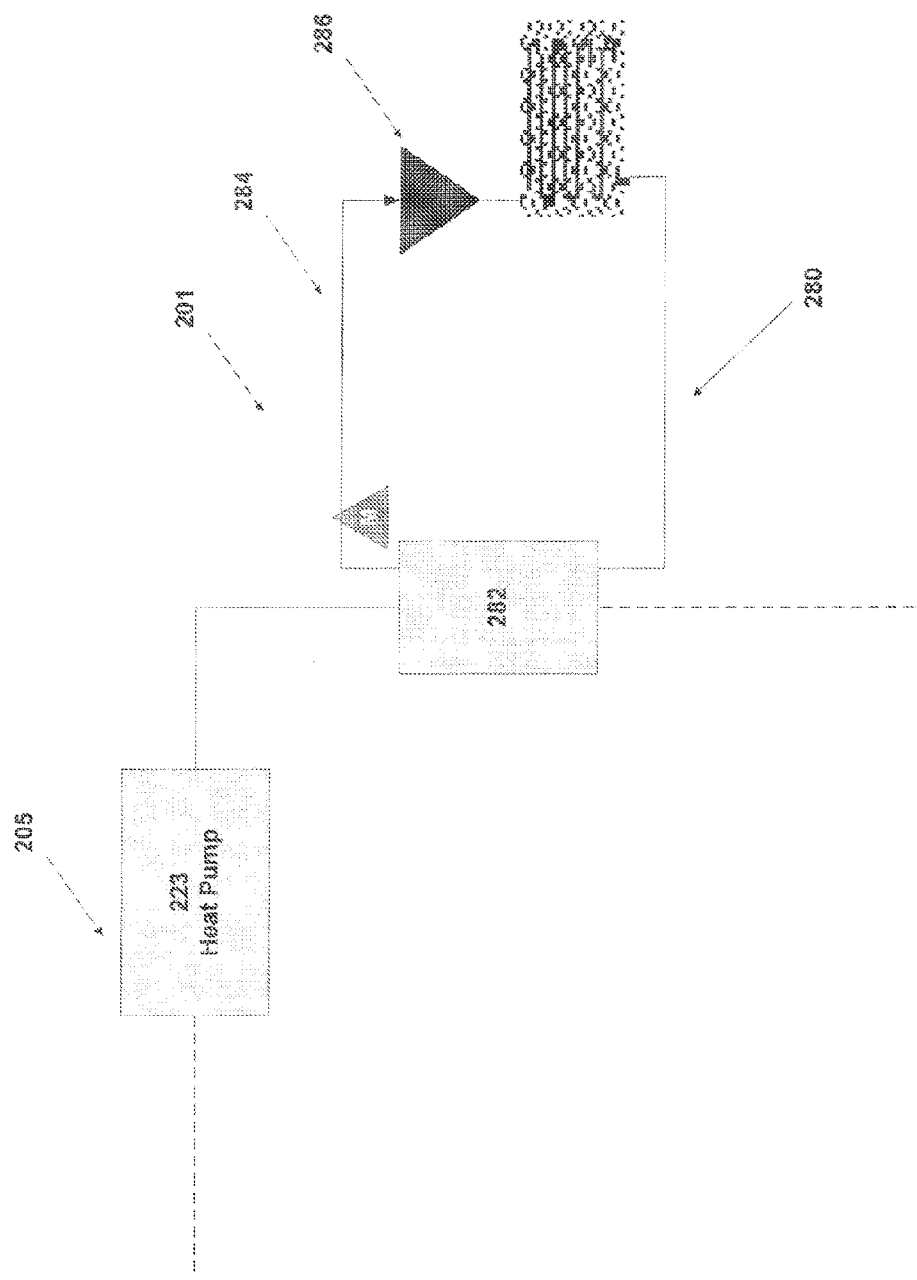
FIG. 3 shows a schematic view of a portion of an energy generation system in accordance with a third embodiment of the present invention.

With reference to FIG. 3, a portion of an energy generation system is represented generally by reference numeral 201.

The following description of the operation of the energy generation system 201 will be limited only to aspects of operation of the second system 205, with the remainder of the energy generation system 201 operating in the same fashion as the energy generation system 1 of the first embodiment.

This embodiment is similar to the embodiment of FIG. 1, but for the additional inclusion of a device 280 for cooling the ambient surrounding air.

The device 280 comprises an enclosed tube 282 disposed around the second conduit 221 downstream of the heat pump 223. The tube 282 contains ammonia in a liquid state, which has its temperature raised on account of the fluid at high temperature passing through the portion of the second conduit 21 which the tube 282 surrounds. The tube 282 comprises a subsidiary conduit 284 into which ammonia gas leaving the tube 282 at M can pass. The ammonia gas then passes through a thermo expansion valve 286, whereupon it is cooled, returning the ammonia to a liquid state. The liquid ammonia then passes into a heat exchanger, whereupon heat energy is transferred from the ambient surrounding air to the liquid ammonia, to thereby cool the ambient surrounding air. The liquid ammonia then passes back into the tube 282 and the process starts again.

It is to be appreciated that the above described energy generation system has a number of advantages, for example, increasing the efficiency of the photovoltaic panel by cooling, heating water stored in the water tank, efficiently generating electricity at the Stirling Engine and providing air cooling effects to the ambient surrounding air.

It is to be appreciated that there is required to be energy inputted to the system in order to operate the heat pump, however, the increase in efficiency of the Stirling Engine can at least in part offset the energy required to be inputted to the system in order to operate the heat pump. Moreover, the increase in efficiency of the photovoltaic panel can additionally at least in part offset the energy required to be inputted to the system in order to operate the heat pump.

In particular, the above described energy generation system efficiently converts solar energy into heat energy and electrical energy.

It will be appreciated by persons skilled in the art that the above embodiments have been described by way of example only, and not in any limitative sense, and that various alterations and modifications are possible without departing from the scope of the invention as defined by the appended claims.

The invention claimed is:

1. An energy generation system comprising:
   a first system comprising an electrical generator configured to convert at least a portion of solar energy into electrical energy and a first conduit containing first fluid configured to remove heat from said electrical generator; and
   a second system, in thermal contact with said first system by means of a device configured to transfer heat energy from said first system to said second system, said second system comprising a second conduit containing second fluid, wherein said second conduit passes through a heat pump, a first side of a device configured to convert heat energy into electrical energy, a device configured to transfer heat energy from said second system to a third system, a thermo-expansion valve, and a second side of said device configured to convert heat energy into electrical energy, and wherein:
   said heat pump is configured to input heat energy into said second system and is arranged downstream to said device configured to transfer heat energy from said first system to said second system;
   said first side of said device configured to convert heat energy into electrical energy is arranged downstream to said heat pump;
   said device configured to transfer heat energy from said second system to said third system is arranged downstream of said first side of said device configured to convert heat energy into electrical energy;
   said thermo-expansion valve is arranged downstream of said device configured to transfer heat energy from said second system to said third system; and
   said second side of said device configured to convert heat energy into electrical energy is arranged downstream to said thermo-expansion valve and is arranged upstream of said device configured to transfer heat energy from said first system to said second system.

2. An energy generation system as claimed in claim 1, wherein said electrical generator configured to convert at least a portion of solar energy into electrical energy comprises at least one photovoltaic cell.

3. An energy generation system as claimed in claim 1, wherein said device configured to convert heat energy into electrical energy comprises a Stirling Engine.

4. An energy generation system as claimed in claim 1, wherein said device configured to transfer heat energy from said first system to said second system comprises a heat exchanger.

5. An energy generation system as claimed in claim 1, further comprising a third system in thermal contact with said second system, said third system comprising a fluid reservoir.

6. An energy generation system as claimed in claim 1, wherein said device configured to transfer heat energy from said second system to said third system comprises a condenser.

7. An energy generation system as claimed in claim 5, wherein said third system further comprises at least one third conduit containing a fluid.

* * * * *